(12) United States Patent
Islam et al.

(10) Patent No.: US 11,909,486 B2
(45) Date of Patent: *Feb. 20, 2024

(54) TECHNIQUES FOR MANAGING BEAMS IN MULTIPLE FREQUENCY BANDS

(71) Applicant: QUALCOMM Incorporated, San Diego, CA (US)

(72) Inventors: Muhammad Nazmul Islam, Littleton, MA (US); Changhwan Park, San Diego, CA (US); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,032

(22) Filed: Nov. 10, 2022

(65) Prior Publication Data
US 2023/0073724 A1    Mar. 9, 2023

Related U.S. Application Data

(63) Continuation of application No. 17/394,843, filed on Aug. 5, 2021, now Pat. No. 11,515,920.

(60) Provisional application No. 63/063,161, filed on Aug. 7, 2020.

(51) Int. Cl.
*H04L 5/12* (2006.01)
*H04B 7/06* (2006.01)
*H04L 5/00* (2006.01)
*H04W 36/06* (2009.01)

(52) U.S. Cl.
CPC ......... *H04B 7/0639* (2013.01); *H04B 7/0695* (2013.01); *H04L 5/0023* (2013.01); *H04W 36/06* (2013.01)

(58) Field of Classification Search
CPC ... H04B 7/0639; H04B 7/0695; H04L 5/0023; H04W 36/06
USPC ................ 375/262, 261, 259, 219, 295, 316
See application file for complete search history.

(56) References Cited

U.S. PATENT DOCUMENTS

| | | | |
|---|---|---|---|
| 2020/0053800 A1* | 2/2020 | Deng | H04L 5/0048 |
| 2020/0220604 A1* | 7/2020 | Simonsson | H04B 7/0626 |
| 2022/0045732 A1 | 2/2022 | Islam et al. | |

\* cited by examiner

*Primary Examiner* — Zewdu A Kassa
(74) *Attorney, Agent, or Firm* — Kevin M. Donnelly; ArentFox Schiff LLP

(57) ABSTRACT

Aspects described herein relate to concurrently communicating with a base station over multiple frequency bands using a same first beam, and switching, according to beam switching criteria, from the first beam to a second beam during a time period, wherein the time period is based on a timing reference associated with a reference band.

20 Claims, 9 Drawing Sheets

TECHNIQUES FOR MANAGING BEAMS IN MULTIPLE FREQUENCY BANDS

Claim of Priority under 35 U.S.C. §119

The present Application for Patent is a continuation of Patent Application No. 17/394,843, entitled "TECHNIQUES FOR MANAGING BEAMS IN MULTIPLE FREQUENCY BANDS" filed Aug. 5, 2021, which claims priority to Provisional Patent Application No. 63/063,161, entitled "TECHNIQUES FOR MANAGING BEAMS IN MULTIPLE FREQUENCY BANDS" filed Aug. 7, 2020, which are assigned to the assignee hereof and hereby expressly incorporated by reference herein for all purposes.

TECHNICAL FIELD

The present disclosure relates generally to wireless communication systems, and more particularly, to techniques for managing beams in multiple frequency bands.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support communicating over multiple frequency bands, such as by way of carrier aggregation (CA) where devices can use multiple component carriers (CCs) for communications with one another. A base station can configure a UE to use multiple CCs for CA to communicate with the base station or with other base stations. The UE can use a single common beam to beamform antenna resources for communicating over each of the multiple CCs. In addition, the UE can switch the common beam to a different common beam, having a different beamforming direction, based on UE mobility (as the UE moves locations with respect to the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of the disclosure, a method, or an apparatus or a computer-readable medium to perform the method, are provided. In some aspects, the method includes concurrently communicating with a base station over multiple frequency bands using a same first beam, and switching, according to beam switching criteria, from the first beam to a second beam during a time period, where the time period is one of a limited number of time periods during which a user equipment (UE) is allowed to switch the first beam to the second beam within a specified duration, or based on a timing reference associated with a reference band of the multiple frequency bands.

In another aspect, a method includes communicating with a UE over multiple frequency bands using a first beam to beamform antenna resources for communications over the multiple frequency bands, and transmitting, to the UE, an indication of one or more parameters for determining a reference band of the multiple frequency bands to use as a timing reference for switching beams for communicating over the multiple frequency bands.

In another aspect, a method includes concurrently communicating with a base station over multiple frequency bands using a same first beam, and switching, according to beam switching criteria, from the first beam to a second beam during a time period, wherein the time period is based on a timing reference associated with a reference band.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements

DETAILED DESCRIPTION

Figure 1:
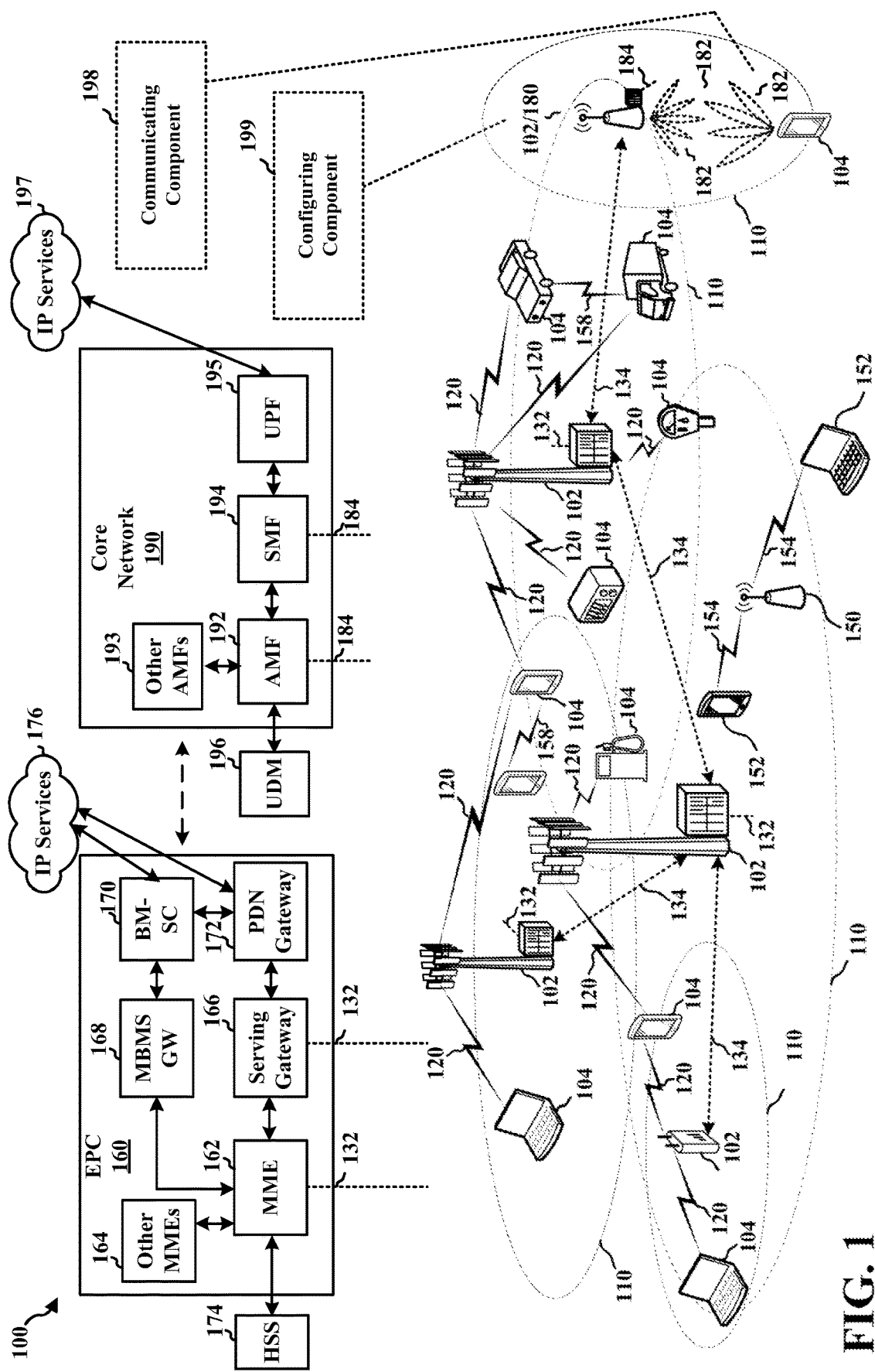
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

Various aspects relate generally to techniques for managing beams in multiple frequency bands. Some aspects more specifically relate to managing a common beam that is used to beamform antenna resources for communicating over multiple frequency bands. In some aspects, a user equipment (UE) can use multiple frequency bands, for example, associated with multiple configured component carriers (CCs) to communicate with a network entity such as a base station or another UE. The UE can beamform antenna resources using a common beam to communicate over each of the multiple frequency bands. As the UE moves location with respect to a base station, or as the communication environment changes (for example, in the presence of signal blocking or reflection by objects), the UE may desire to change the common beam for improved signal strength and quality when communicating with the base station. Communications over the multiple frequency bands, however, may not be aligned in time, and as such, switching the common beam based on considerations for a first frequency band of the multiple frequency bands, may cause beam failure or otherwise loss of communication on a second frequency band of the multiple frequency bands. For example, if the maximum difference between a time a first signal is received by the UE in a first frequency band and a time a second signal is received by the UE in a second frequency band ("receive time difference (RTD)") among the multiple frequency bands is greater than a threshold (for example, greater than a period of time associated with a cyclic prefix (CP)), the UE may fail to successfully receive one or more symbols in at least one of the multiple frequency bands when the UE (or a network entity) switches the common beam.

In some aspects, the UE can determine a limited number of time periods during which the UE can perform beam switching of the common beam, such as to mitigate degradation in communications over the multiple frequency bands. For example, the time periods can correspond to symbols (for example, orthogonal frequency division multiplexing (OFDM) symbols) over which the UE can perform the beam switching of the common beam, where the symbols may correspond to a slot containing multiple symbols. In another example, the time periods can include collections of symbols, such as one or more slots. For example, the UE can determine to use symbols associated with a transmission gap that are between uplink symbols defined for uplink communications and downlink symbols defined for downlink communications in a slot. In another example, the UE can determine to avoid using symbols over which synchronization signal blocks (SSBs), physical downlink control channel (PDCCH) search spaces, or reference signals (RSs) are transmitted. In yet another example, the UE can determine to use symbols based on a function of a slot or symbol index.

In some other aspects, the UE can determine one of the multiple frequency bands (referred to herein as a "reference band") to use as a timing reference. The reference band can be the frequency band over which the beam switch is performed or otherwise managed. In some examples, the UE can determine the reference band as a higher priority band of the multiple frequency bands. In this regard, the base station and UE can know the beam switch is occurring over particular resources of the reference band and can avoid communicating over the reference band during the beam switch. Communications may continue, however, over the non-reference bands during the beam switch. Accordingly, the UE can determine the reference band as a frequency band having a highest signal metric, a most recently reported signal metric, a lower index (for example, a lower channel index, such as E-UTRA absolute radio frequency channel number (EARFCN) index, an index within a configuration of channels or bands received from the base station, or other examples), a center frequency, a most frequent PDCCH search space (for example, a channel having PDCCH configured to occur more frequently than other channels), or channels with higher priority than channels in other frequency bands, among other examples.

Particular implementations of the subject matter described in this disclosure can be implemented to realize one or more of the following potential advantages. In some aspects of the present disclosure, limiting the symbols over which the UE can perform common beam switching can enable the UE to avoid communication degradation or disruption otherwise caused on some frequency bands (for example, non-reference frequency bands) when switching the common beam. In addition, in some aspects, selecting the reference band from the multiple frequency bands may enable the UE to prioritize a most used or most desirable frequency band for performing or managing the beam switching to avoid an unexpected disruption of communications on this frequency band.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming to generate beamformed signals 182 (also referred to as "beams") with the UE 104 to compensate for the extremely high path loss and short range. The base station 180 and the UE 104 may each include a plurality of antennas, such as antenna elements, antenna panels, or antenna arrays to facilitate the beamforming. Though base station 102 and mmW base station 180 are separately shown, aspects described herein with respect to a base station 102 can relate to, and be implemented by, a mmW base station 180.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a communicating component 198 configured to determine one or more time periods during which to switch a common beam (for example, one of the beams 182) for multiple frequency bands over which the UE 104 communicates with a base station 102. In another aspect, communicating component 198 can be configured to determine a reference band to use in performing the beam switching. In some aspects, the base station 102 may include a configuring component 199 configured to indicate, to the UE 104, time periods during which to performing beam switching of a common beam for multiple frequency bands, or one or more parameters for determining a reference band for performing the beam switching, among other examples. Although the following description may be described in terms of 5G NR and related features, the concepts described herein may be applicable to other areas or wireless communication technologies, such as LTE, LTE-A, CDMA, GSM, or future communications standards or technologies.

Figure 2:
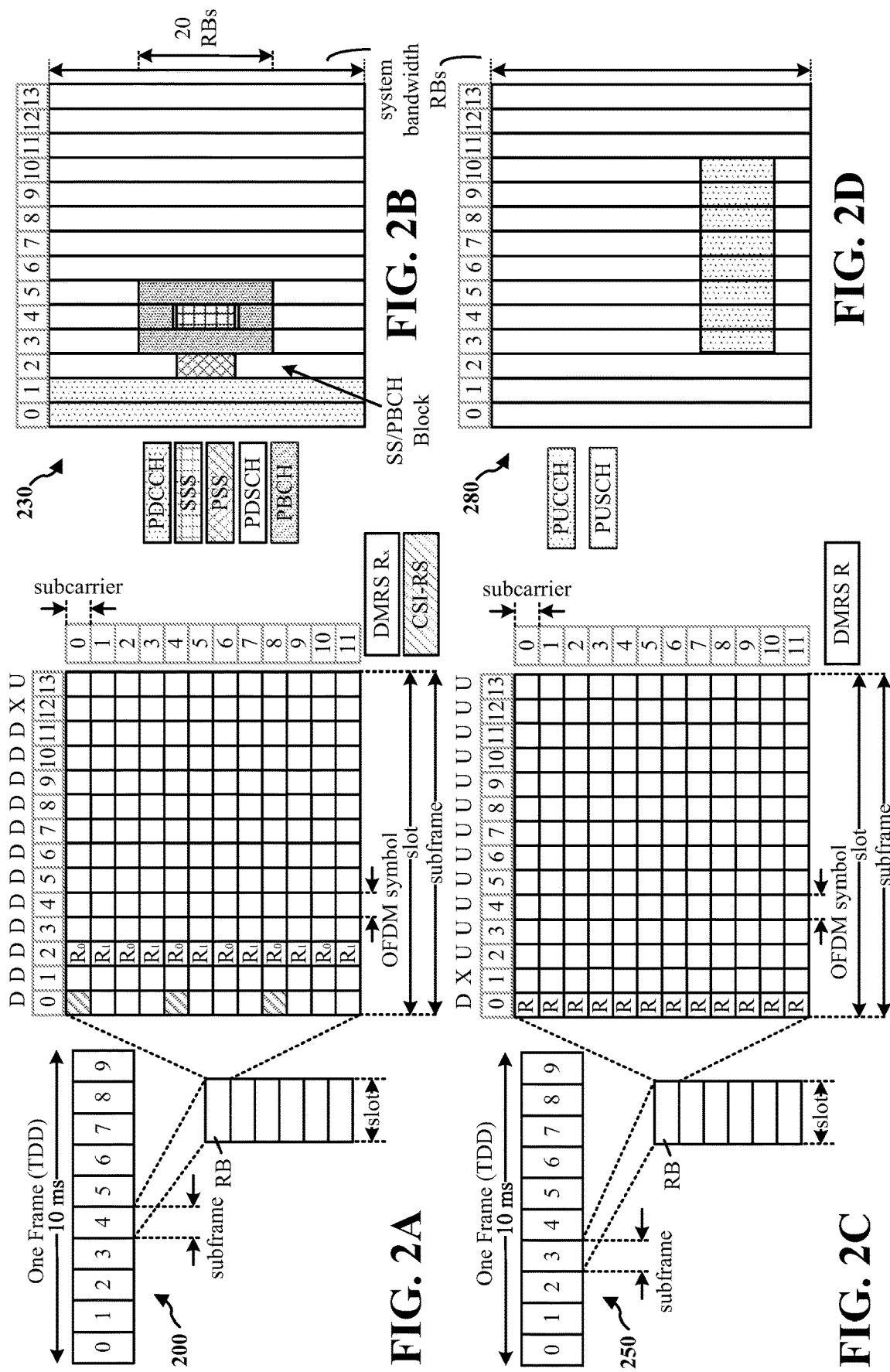
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu *15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
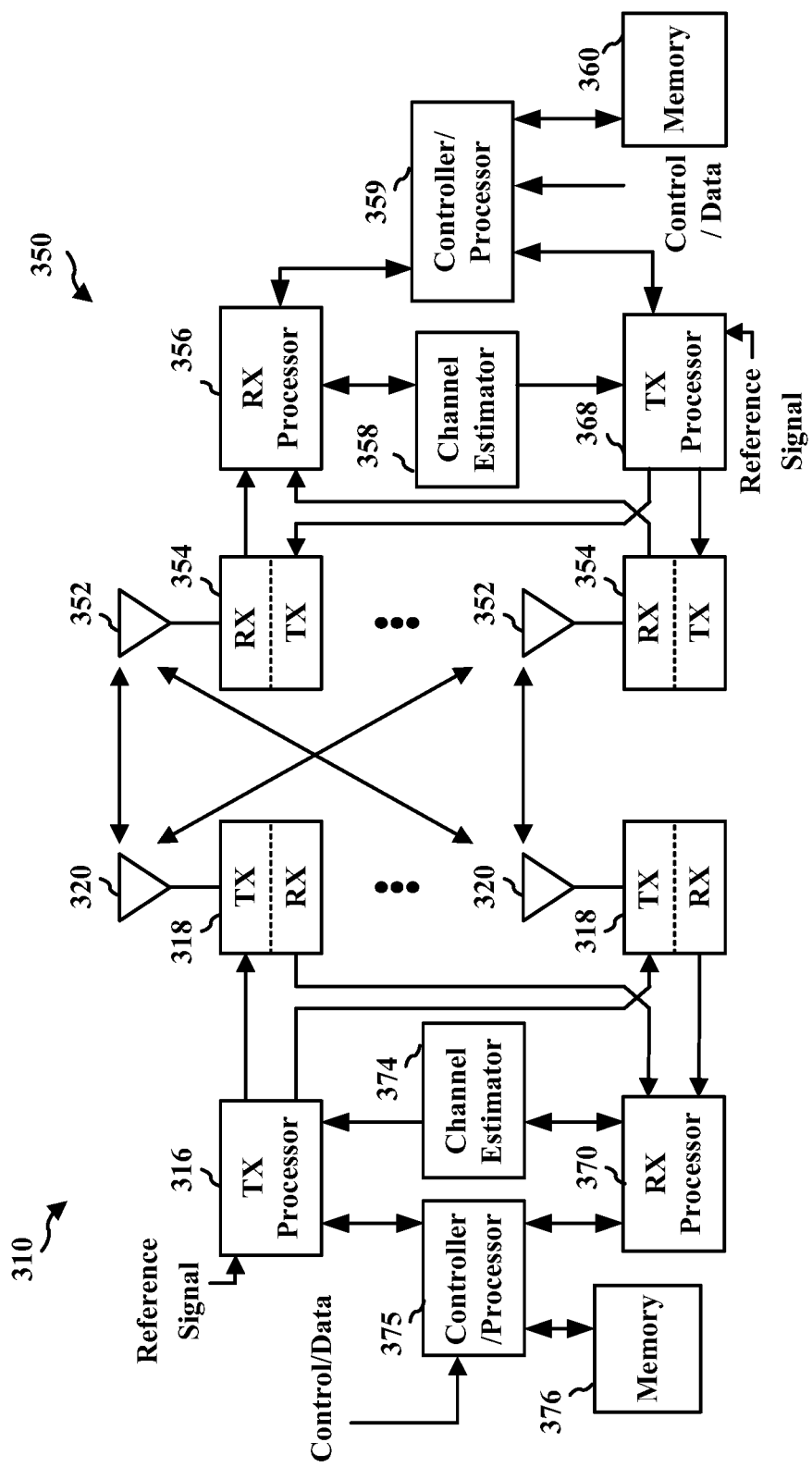
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with communicating component 198 of FIG. 1.

At least one of the TX processor 316, the RX processor 370, and the controller/processor 375 may be configured to perform aspects in connection with configuring component 199 of FIG. 1.

Some wireless communication technologies, such as LTE, support dedicated broadcast carriers. For example, in LTE, a carrier can be downlink-only, multimedia broadcast multicast service (MBMS)-only (for example, no unicast support). This can be similar in spirit to MB standards like DVB-T, ATSC. Content can typically be free-to-air, where receivers may not need to be registered with the network or have credentials (such as subscriber identity module (SIM) credentials) to receive the service (for example, TV service, car or automobile related broadcast information). In many countries around the world, the channelization of broadcast frequency bands for MB services is in units of bandwidths that are not compatible with LTE bandwidths. For example, LTE supports system bandwidths of 1.4, 3, 5, 10, 15, 20 megahertz (MHz), which correspond to 6, 15, 25, 50, 75 and 100 physical resource blocks (PRBs). In Europe, for example, channelization for MB service channels may be in chunks of bandwidth of 8, 7, 6 MHz. For deploying in some regions and some frequency bands, aspects described herein relate to supporting these MB bandwidths in the radio access technology (for example, NR, LTE).

Figure 4:
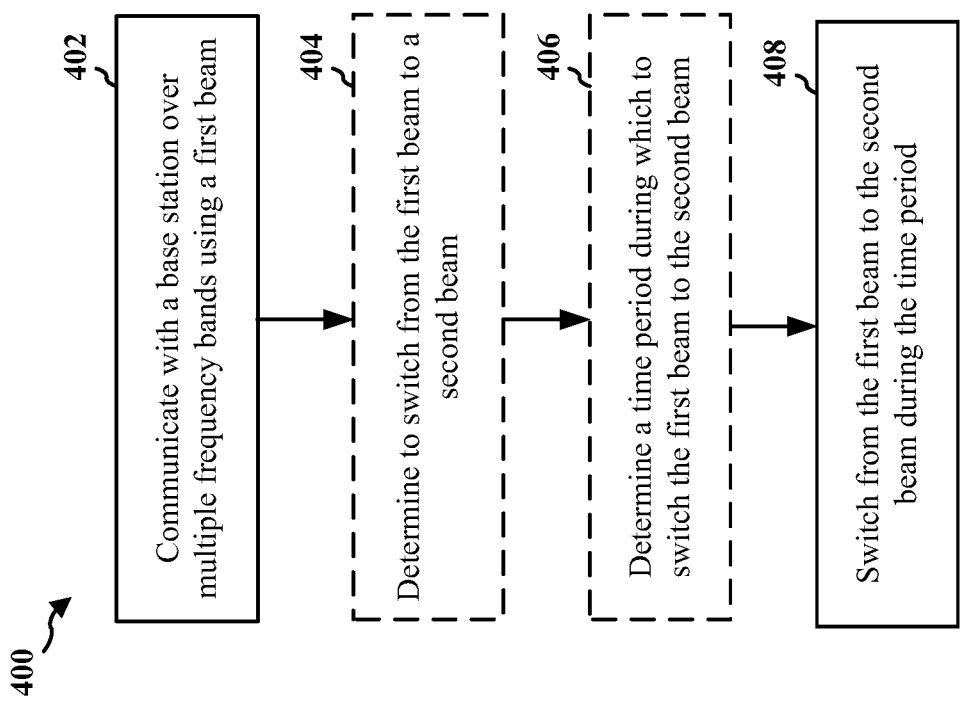
FIG. 4 is a flowchart of an example of a method for determining a time period for switching a common beam in accordance with some aspects of the present disclosure.

FIG. 4 is a flowchart of an example of a method 400 for determining a time period for switching a common beam in accordance with some aspects of the present disclosure. The method 400 may be performed by a UE (such as the UE 104, the wireless communication device 700, or the wireless communication device 800). In some examples, the method 400 may be performed by a portion of a UE 104, wireless communication device 700, or wireless communication device 800, such as including the memory 360, the memory 708, the TX processor 368, the RX processor 356, the controller/processor 359, the processor 706, or other components described herein.

In block 402, the UE communicates with a base station over multiple frequency bands using a first beam. For example, the UE 104 can be configured with multiple frequency bands for communicating with the base station 102 or other base stations. In some implementations, the communicating component 198 (which may include or operate in conjunction with one or more of the TX processor 368, the RX processor 356, the controller/processor 359, the memory 360, the receiver or transmitter 354, the modem 702, the radio 704, the processor 706, the memory 708, the reception component 808, the transmission component 810, or other components described herein) can communicate with the base station over the multiple frequency bands using the first beam. In some examples, the multiple frequency bands may correspond to CCs configured by the base station (for example, in a CA mode or a dual connectivity or multiple connectivity mode, among other examples). In addition, in some examples, communicating component 198 can concurrently communicate over the multiple frequency bands, which may include concurrently receiving downlink communications from the base station over the multiple frequency bands using the first beam, concurrently transmitting uplink communications to the base station over the multiple frequency bands using the first beam, or receiving communications from the base station over a first frequency band of the multiple frequency bands while concurrently transmitting communications to the base station over a second frequency band of the multiple frequency bands using the first beam.

In some examples, communicating component 198 can determine the first beam, based on a beam indicated to the base station 102, as a beam that the UE 104 selects during a beam training procedure. The selected beam may correspond to a beam transmitted by the base station 102 or a corresponding (for example, reciprocal) receive beam. In another example, communicating component 198 can select a transmit beam and receive beam pair ("transmit/receive beam pair") and can indicate the selected beam pair to the base station 102. In any case, for example, communicating component 198 can communicate with the base station 102 using the appropriate beam. In addition, communicating component 198 can use the beam as a common beam for the multiple frequency bands.

As described, as the UE 104 moves locations with respect to the base station 102, other beams can become more desirable and the UE 104 may determine, or be instructed (for example, by the base station), to switch beams. In method 400, optionally at block 404, UE 104 can determine to switch from the first beam to a second beam. In an aspect, beam switching component 816, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can determine to switch from the first beam to the second beam to communicate over the multiple frequency bands. For example, beam switching component 816 can determine to switch from the first beam to the second beam based on beam switching criteria configured for the UE 104, which may be configured at the UE 104 (for example, based on a configuration received from base station 102 or otherwise). In some examples, beam switching component 816 can determine to switch from the first beam to the second beam based on at least one of an instruction received from the base station 102 (for example, an indication of beam switching at the base station 102), comparing measurements of signals received from the base station 102 based on the first and second beams, or other examples.

If a UE 104 has a common beam across multiple frequency bands (for example, in CA or other scenarios), a large maximum receive time difference (MRTD) may lead to large performance degradation. For example, the UE 104 may not be able to confine the beam switches inside the CP, and receive or transmit discontinuities may appear in the middle of the symbols on some CCs. Furthermore, the UE beam switches can be transparent to the network so the network may not be aware of beam switches. In frequency range 2 (FR2) for inter band CA with common beam management (CBM), different base station beams from a base station may reach the UE 104 through different paths. As a result, when base station switches its TX beam, the UE can change its RX beam and reception time to receive signal with the new TX beam. As the UE receives these bands with a common beam, when base station switches its beam, UE can simultaneously change the RX beams for all FR2 bands (for example, as a common beam). If RTD among these bands is greater than a threshold (for example, a timing of CP), the UE may lose a symbol on the other bands in this CA scenario. Thus, according to aspects described herein, communicating component 198 can determine a time period to switch the common beam that mitigate communication disruptions on the multiple frequency bands.

As such, for example, in method 400, optionally at block 406, UE 104 can determine a time period during which to switch from the first beam to the second beam. In some aspects, time period determining component 812, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can determine the time period during which to switch from the first beam to the second beam. As described above and further herein, the time period can be one of a limited number of time periods within a specified duration during which the UE is allowed to switch the first beam to the second beam or can correspond to, or be otherwise based on, a timing reference associated with a reference band.

For example, time period determining component 812 can determine the time period based on a limited number or selection of time periods. For example, time period determining component 812 can determine the time period based on a limited number or selection of symbols (for example, in a given slot or otherwise). Moreover, for example, time period determining component 812 can determine the time period based on the limited number or selection of time periods to lessen possible disruption in communications over at least some of the multiple frequency bands. Moreover, in some examples, time period determining component 812 can determine the time period(s) for a specified duration and may be consecutive or non-consecutive time periods within the specified duration. For example, the specified duration may be configured for the UE 104 by the base station 102 or may be otherwise known by, or stored in an implementation or configuration of, the UE 104. In one example, the specified duration may be a slot of multiple symbols, and the limited number of time periods can include one or more of the multiple symbols in the slot. In another example, time period determining component 812, as described further herein, can determine the time period based on a reference band, which may be one of the multiple frequency bands determined as the reference band for a timing reference.

In the example described above in FR2, the UE 104 can use one frequency band's (for example, the reference band's) timing as the reference timing and use that to change or switch beams for all FR2 bands that it receives with the common beam. In some examples, time period determining component 812 can limit the number of symbols due to UE's autonomous beam switch (which can be transparent to the network) and define the symbols where UE is allowed to perform autonomous beam switch. For example, the time period determining component 812 can effectively limit autonomous RX beam switch in time periods that minimize or lessen impact network performance, such as by limiting the time periods to gap symbols between downlink and uplink in one or more slots (also referred to as UL/DL guard symbols). In one example, the UE 104 can report the actual RTD to the base station 102, and the base station 102 can accordingly set the UL/DL guard symbols based on the actual reported RTD (or not set the UL/DL guard symbols where the RTD is less than the CP).

In another example, time period determining component 812 can limit the number of symbols to given symbols of given subframes, which can be defined based on a function of one or more parameters (for example, symbol X of slot N where N can be 0 modulo Z). In another example, time period determining component 812 can limit the number of symbols to those that do not include particular communications or channels, such as SSBs, PDCCH search spaces, RSs, or other examples. This can be beneficial as PDCCH may trigger bandwidth part (BWP) switching, transmission control indicator (TCI) update, PDCCH-ordered physical random access channel (PRACH), or other examples of time critical communications. As such, time period determining component 812 can determine to exclude such symbols from the time periods for beam switching to avoid disrupting the time critical communications.

In method 400, at block 408, UE 104 can switch from the first beam to the second beam during the time period. In some aspects, beam switching component 816, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can switch from the first beam to the second beam during the time period, where the time period can be one or more of the time periods described above (for example, one of a limited number of time periods within a specified duration during which the UE is allowed to switch the first beam to the second beam or based on a timing reference associated with a reference band). For example, during the time period, beam switching component 816 can switch the beam by modifying the beamforming of antenna resources to achieve the second beam for communicating with the base station 102. As described, the beam switching may result in some dropped symbols on some of the frequency bands (for example, frequency bands that are not the reference band for beam switching), but time period determining component 812 can determine to perform the switching over given symbols that result in minimizing communication disruption.

Figure 5:
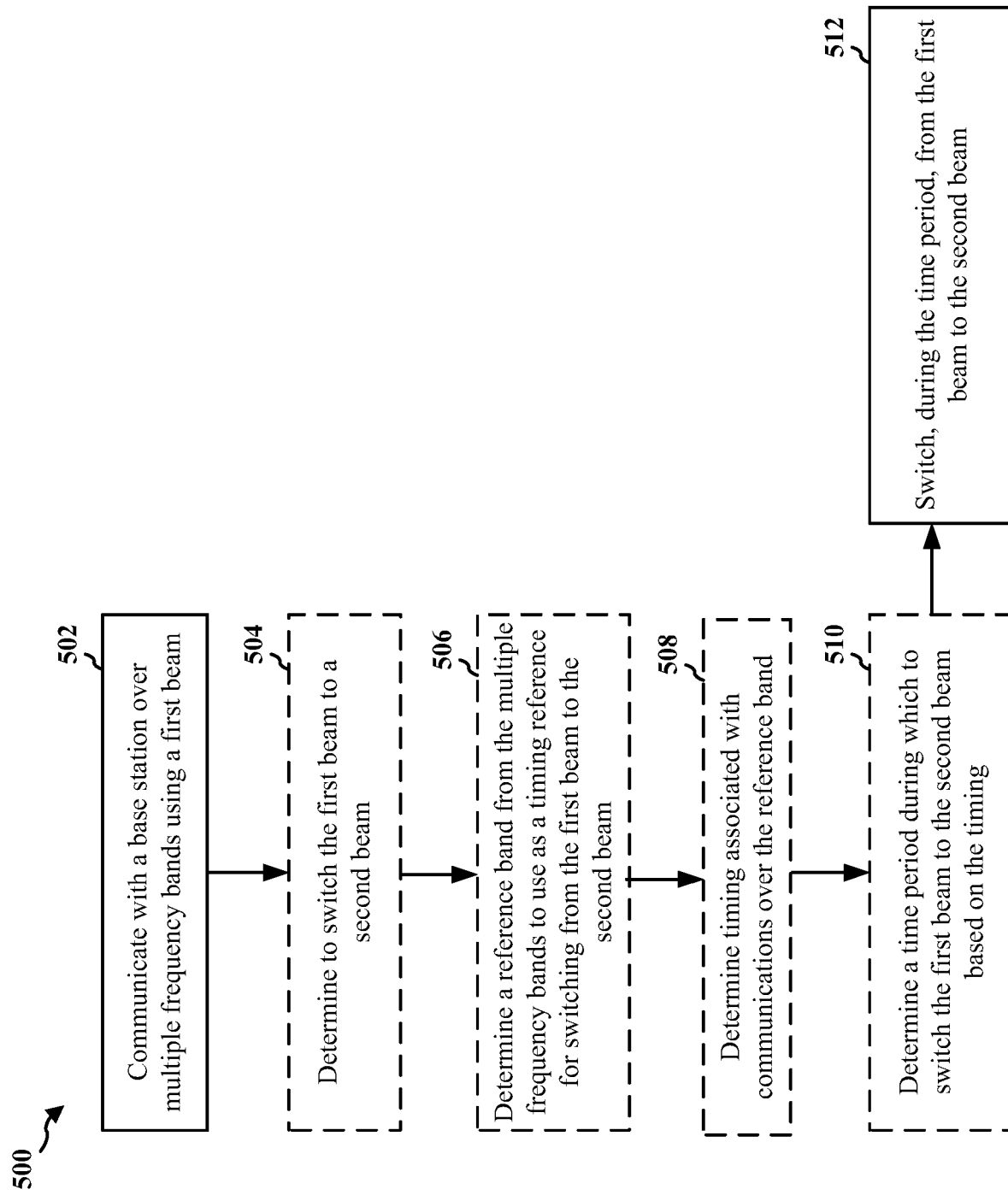
FIG. 5 is a flowchart of an example of a method for determining a reference band for switching a common beam in accordance with some aspects of the present disclosure.

FIG. 5 is a flowchart of an example of a method 500 for determining a reference band for switching a common beam in accordance with some aspects of the present disclosure. The method 500 may be performed by a UE (such as the UE 104, the wireless communication device 700, the wireless communication device 800). In some examples, the method 500 may be performed by a portion of a UE 104, wireless communication device 700, or wireless communication device 800, such as by the memory 360, memory 708, the TX processor 368, the RX processor 356, or the controller/processor 359, processor 706, or other components.

In method 500, at block 502, UE 104 can communicate with a base station over multiple frequency bands using a first beam. In some aspects, communicating component 198, for example, in conjunction with one or more of the TX processor 368, the RX processor 356, or the controller/processor 359, the memory 360, the receiver or transmitter 354, modem 702, radio 704, processor 706, memory 708, reception component 808, transmission component 810, or other components, can communicate with the base station over multiple frequency bands using the first beam. For example, communicating component 198 can communicate using the first beam as described above with reference to block 402 of method 400 of FIG. 4.

In method 500, optionally at block 504, UE 104 can determine to switch from the first beam to a second beam. In some aspects, beam switching component 816, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can determine to switch from the first beam to the second beam. For example, beam switching component 816 can determine to switch from the first beam to the second beam as described above with reference to block 404 of method 400 of FIG. 4.

In method 500, optionally at block 506, UE 104 can determine a reference band from the multiple frequency bands to use as a timing reference for switching from the first beam to the second beam. In some aspects, reference band determining component 814, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can determine the reference band from the multiple frequency bands to use as the timing reference for switching from the first beam to the second beam. For example, reference band determining component 814 can determine which of the multiple frequency bands to use as the reference band based on an indication received from the base station 102 or based on other considerations of the multiple frequency bands, as described herein. For example, reference band determining component 812 can compare aspects or parameters of the multiple frequency bands with one another to determine the reference band.

In some examples, reference band determining component 814 can determine the reference band based on explicit signaling from the base station 102. For example, as described further herein, the base station 102 (for example, or a network component via the base station 102) can explicitly inform the UE 104 about the reference band, or can explicitly inform the UE 104 about the non-reference bands (for example, the bands whose symbols can be dropped). In an example, where the base station 102 informs the UE 104 about the non-reference bands, UE 104 can determine the reference band to be a band other than the non-reference bands and/or based on comparing parameters, as described, of the bands not indicated as non-reference bands. In this example, when performing beam switching, the UE may be dropping symbols in UL or DL on particular CCs (for example, the non-reference frequency bands). In another example, reference band determining component 814 can determine the reference band as the band where UE 104 measured signal strength or quality (RSRP, SINR, RSRQ, or other examples) and reported to the base station (or an associated a serving cell) most recently or the band with the better SINR or higher throughput. In either case, for example, the base station 102 can also be aware of the determined reference band based on UE's report of the measured signal strength or quality.

In another example, reference band determining component 814 can determine the reference band based on implicit parameters or considerations. For example, reference band determining component 814 can determine the reference band as the frequency band of the multiple frequency bands that has the lower index (for example, where the index can relate to an index of the band in a configuration received from the base station 102 or otherwise known at the UE). In another example, reference band determining component 814 can determine the reference band as the frequency band of the multiple frequency bands that includes the center frequency. In another example, reference band determining component 814 can determine the reference band as the frequency band of the multiple frequency bands where PDCCH search space is more frequent (for example, where the PDCCH search space is configured more frequently over a set of time resources, such as over one or more slots or symbols of one or more slots). In another example, reference band determining component 814 can determine the reference band as the frequency band of the multiple frequency bands where UE received most PDCCHs, for example, the band where UE reported most ACK/NACKs or PUSCHs for PDCCH, which may be an explicit selection.

In another example, reference band determining component 814 can determine the reference band as the frequency band of the multiple frequency bands that has channels with higher priority. For example, reference band determining component 814 can determine the priority for the channels for determining the reference band based on various rules. For example, reference band determining component 814 can determine the priority for the channels based on channel type of channels transmitted over the band (for example, PUCCH can have a higher priority than SRS, which can have a higher priority than PUSCH). In another example, reference band determining component 814 can determine the priority for the channels based on channel contents (for example, channels for transmitting ACK/NACK can have higher priority than channels for transmitting SR, which can have higher priority than channels for transmitting RI, which can have higher priority than channels for transmitting CQI). In another example, reference band determining component 814 can determine the priority for the channels based on reference signal type (for example, channels for transmitting DM-RS can have higher priority than channels for transmitting phase tracking reference signal (PTRS), which can have higher priority than channels for transmitting other RSs). In another example, reference band determining component 814 can determine the priority for the channels based on subcarrier spacing (SCS) (for example, channels having high SCS can have higher priority than channels having low SCS). In some examples, higher SCS may be more vulnerable to part of symbol/slot missing and lower SCS may support delay tolerant services. In another example, reference band determining component 814 can determine the priority for the channels based on a number of symbols for the band (for example, channels for channels having a low number of symbols can have higher priority than channels for channels having a high number of symbols in a similar time period). In another example, reference band determining component 814 can determine the priority for the channels based on whether DL beam RSs are included (for example, channels on CC with DL beam RS can have higher priority than channels on other CCs). In another example, reference band determining component 814 can determine the priority for the channels based on whether feedback is received corresponding to a higher or lower SCS (for example, channels for which ACK/NACK corresponds to higher PDSCH SCS can have higher priority than channels for which ACK/NACK corresponds to lower PDSCH SCS). In another example, reference band determining component 814 can determine the priority for the channels based on a number of instances of feedback received (for example, channels for which a high number of ACK/NACKs are received can have higher priority than channels for which a low number of ACK/NACKs are received over a similar time period). In another example, reference band determining component 814 can determine the priority for the channels based on channel quality indicator (CQI) part corresponding to the channel (for example, channels for transmitting CQI part-I can have a higher priority than channels for transmitting CQI part-II). In another example, reference band determining component 814 can determine the priority for the channels based on whether the channel or corresponding signal is scheduled or autonomous (for example, scheduled channel/signal can have higher priority than>autonomous channel/signal).

In addition, in some examples, in determining the channel priority, reference band determining component 814 can update TCI of lower priority channel/signal on a non-reference band to follow the TCI of higher priority channel/signal on the reference band. In addition, for example, at least some of the same channels/signals may be transmitted on multiple frequency bands, and other considerations may be used to determine priority for the reference band, as described above.

In method 500, optionally at block 508, UE 104 can determine timing associated with communications over the reference band. In some aspects, beam switching component 816, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can determine timing associated with communications over the reference band. For example, beam switching component 816 can determine the timing as a symbol location, slot boundary, or other time instance related to communications configured over the reference band.

In method 500, optionally at block 510, UE 104 can determine a time period during which to switch the first beam to the second beam based on the timing. In some aspects, beam switching component 816, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can determine the time period during which to switch the first beam to the second beam based on the timing. For example, beam switching component 816 can determine the time period as a particular symbol, slot, or other examples, for performing beam switching, which can be based on the timing associated with the reference band. In some examples, the time period may be configured by the base station in communications associated with the reference band. In some examples, beam switching component 816 can determine the time period to minimize disruption of communications in the reference band, such as a time period including UL DL gap (for example, guard) symbols, not including particular communication channels, or other examples, as described above.

In method 500, at block 512, UE 104 can switch, during the time period, from the first beam to the second beam during the time period. In some aspects, beam switching component 816, for example, in conjunction with communicating component 198, one or more of the TX processor 368, the RX processor 356, or the controller/processor 359, the memory 360, the receiver or transmitter 354, modem 702, radio 704, processor 706, memory 708, reception component 808, transmission component 810, or other components, can switch, during the time period, from the first beam to the second beam during the time period. For example, during the time period, beam switching component 816 can switch the beam by modifying the beamforming of antenna resources to achieve the second beam for communicating with the base station 102. As described, the beam switching may result in some dropped symbols on some of the frequency bands (for example, frequency bands that are not the reference band for beam switching), but reference band determining component 814 can determine the reference band over which to perform the switching so symbols over the reference band are not lost, which can result in minimizing communication disruption.

Figure 6:
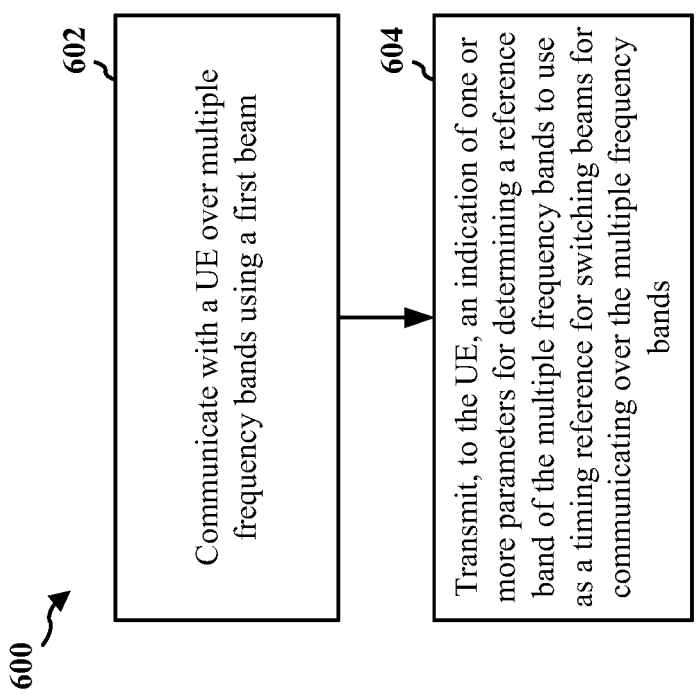
FIG. 6 illustrates an example of a system for configuring a reference band for switching a common beam in accordance with some aspects of the present disclosure.

FIG. 6 is a flowchart of an example of a method 600 for configuring a reference band for switching a common beam in accordance with some aspects of the present disclosure. The method 600 may be performed by a base station (such as the base station 102, the wireless communication device 700, the wireless communication device 900). In some examples, the method 600 may be performed by a portion of a base station 102, wireless communication device 700, or wireless communication device 900, such as by the memory 376, memory 708, the TX processor 316, the RX processor 370, or the controller/processor 375, processor 706, or other components.

In method 600, at block 602, base station 102 can communicate with a UE over multiple frequency bands using a first beam. In some aspects, configuring component 199, for example, in conjunction with one or more of the TX processor 316, the RX processor 370, or the controller/processor 375, the memory 376, the receiver or transmitter 318, modem 702, radio 704, processor 706, memory 708, reception component 908, transmission component 910, or other components, can communicate with the UE over multiple frequency bands using the first beam. For example, the base station 102 can configure multiple frequency bands for communicating with the UE 104. In some examples, the multiple frequency bands may correspond to CCs configured by the base station (for example, in CA, dual connectivity or multiple connectivity, among other examples). In some examples, configuring component 199 can determine the first beam based on a beam indicated by the UE 104 (for example, as a selected beam selected by the UE 104) during a beam training procedure. The selected beam may correspond to a beam transmitted by the base station 102 or a corresponding (for example, reciprocal) receive beam determined by the UE 104. In addition, configuring component 199 can use the beam as a common beam for the multiple frequency bands.

As described, as the UE 104 moves locations with respect to the base station 102, other beams can become more desirable and the UE 104 may determine, or be instructed, to switch beams. As such, switching beams at the UE 104 may include the UE 104 determining a reference band to use for switching the beam. In some examples, base station 102 can instruct the UE 104 on the reference band or one or more parameters for determining the reference band. In method 600, at block 604, base station 102 can transmit, to the UE, an indication of one or more parameters for determining a reference band of the multiple frequency bands to use as a timing reference for switching beams for communicating over the multiple frequency bands. In some aspects, reference band configuring component 912, for example, in conjunction with configuring component 199, one or more of the TX processor 316, the RX processor 370, or the controller/processor 375, the memory 376, the receiver or transmitter 318, modem 702, radio 704, processor 706, memory 708, reception component 908, transmission component 910, or other components, can transmit, to the UE 104, the indication of one or more parameters for determining a reference band of the multiple frequency bands to use as a timing reference for switching beams for communicating over the multiple frequency bands.

In some examples, reference band configuring component 912 can indicate the reference band to the UE 104, can indicate one or more non-reference bands, or other examples, as described above. For example, reference band configuring component 912 can indicate the band(s) in a configuration using radio resource control (RRC) signaling, media access control (MAC) control element (CE), downlink control information (DCI), or other examples. In addition, for example, reference band configuring component 912 can determine the reference band to configure based on signal strength or quality measurements received from the UE 104. For example, reference band configuring component 912 can determine the reference band as the frequency band for which the most recent signal strength or quality report is received from the UE 104, the frequency band having a highest measured signal strength or quality, or other examples as described herein.

Figure 7:
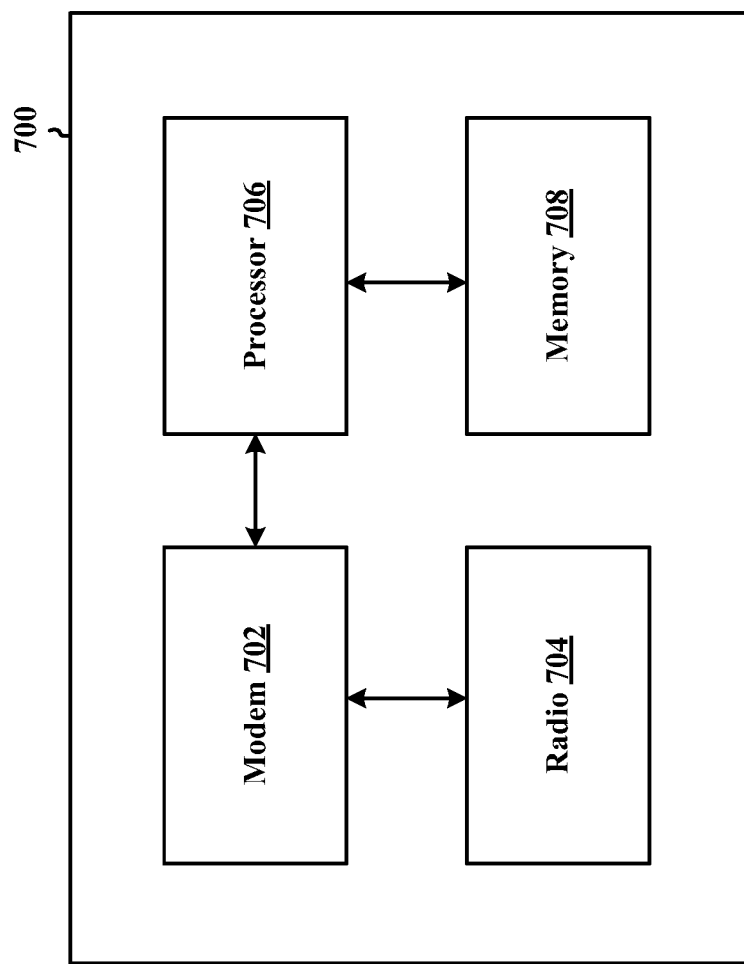
FIG. 7 shows a block diagram of an example wireless communication device.

FIG. 7 shows a block diagram of an example wireless communication device 700. In some implementations, the wireless communication device 700 can be an example of a device for use in a UE such as one of the UEs 104 described with reference to FIG. 1. In some implementations, the wireless communication device 700 can be an example of a device for use in an base station such as the base station 102 described with reference to FIG. 1. The wireless communication device 700 is capable of transmitting (or outputting for transmission) and receiving wireless communications (for example, in the form of wireless packets). For example, the wireless communication device can be configured to transmit and receive packets in the form of packet data convergence protocol (PDCP) protocol data units (PDUs) and medium access control (MAC) PDUs, or other examples.

The wireless communication device 700 can be, or can include, a chip, system on chip (SoC), chipset, package or device that includes one or more modems 702, (collectively "the modem 702"), which can include a WWAN modem (for example, a 3GPP 4G LTE or 5G compliant modem). In some implementations, the wireless communication device 700 also includes one or more radios 704 (collectively "the radio 704"). In some implementations, the wireless communication device 700 further includes one or more processors, processing blocks or processing elements 706 (collectively "the processor 706") and one or more memory blocks or elements 708 (collectively "the memory 708").

The modem 702 can include an intelligent hardware block or device such as, for example, an application-specific integrated circuit (ASIC) among other possibilities. The modem 702 is generally configured to implement a PHY layer. For example, the modem 702 is configured to modulate packets and to output the modulated packets to the radio 704 for transmission over the wireless medium. The modem 702 is similarly configured to obtain modulated packets received by the radio 704 and to demodulate the packets to provide demodulated packets. In addition to a modulator and a demodulator, the modem 702 may further include digital signal processing (DSP) circuitry, automatic gain control (AGC), a coder, a decoder, a multiplexer and a demultiplexer. For example, while in a transmission mode, data obtained from the processor 706 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 704. In implementations involving beamforming, the modulated symbols in the respective spatial streams are precoded via a steering matrix prior to their provision to the IFFT block.

While in a reception mode, digital signals received from the radio 704 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The de-multiplexed bits may then be descrambled and provided to the MAC layer (the processor 706) for processing, evaluation or interpretation.

The radio 704 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 700 can include, or be coupled with, multiple transmit antennas (each with a corresponding transmit chain) and multiple receive antennas (each with a corresponding receive chain). The symbols output from the modem 702 are provided to the radio 704, which then transmits the symbols via the coupled antennas. Similarly, symbols received via the antennas are obtained by the radio 704, which then provides the symbols to the modem 702.

The processor 706 can include an intelligent hardware block or device such as, for example, a processing core, a processing block, a central processing unit (CPU), a microprocessor, a micro-controller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 706 processes information received through the radio 704 and the modem 702, and processes information to be output through the modem 702 and the radio 704 for transmission through the wireless medium. For example, the processor 706 may implement a control plane and MAC layer configured to perform various operations related to the generation and transmission of PDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 706 may generally control the modem 702 to cause the modem to perform various operations described above.

The memory 708 can include tangible storage media such as random-access memory (RAM) or read-only memory (ROM), or combinations thereof. The memory 708 also can store non-transitory processor- or computer-executable software (SW) code containing instructions that, when executed by the processor 706, cause the processor to perform various operations described herein for wireless communication, including the generation, transmission, reception and interpretation of PDUs, frames or packets. For example, various functions of components disclosed herein, or various blocks or steps of a method, operation, process or algorithm disclosed herein, can be implemented as one or more modules of one or more computer programs.

Figure 8:
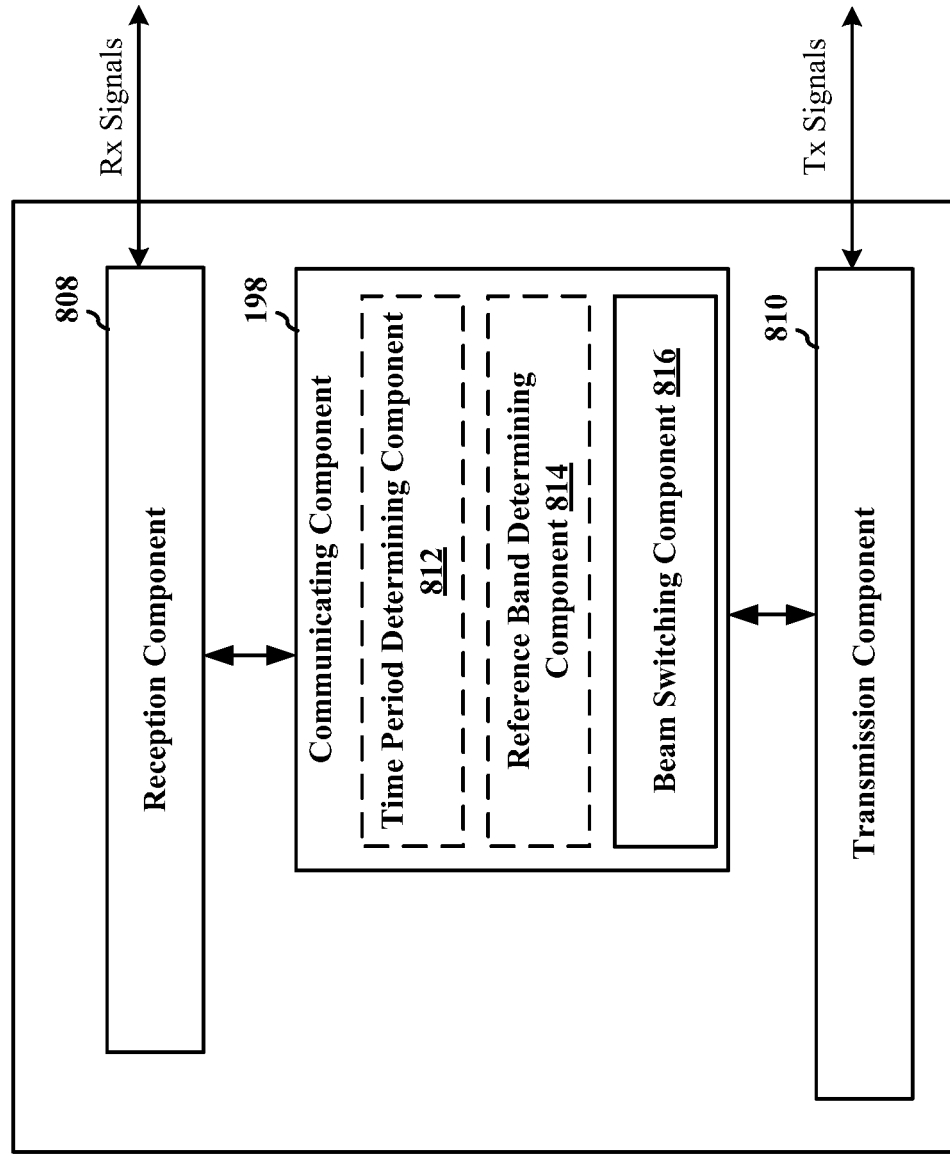
FIG. 8 shows a block diagram of an example wireless communication device according to some implementations.

FIG. 8 shows a block diagram of an example wireless communication device 800 according to some implementations. In some implementations, the wireless communication device 800 is configured to perform any of the processes 400 or 500 described above with reference to FIGS. 4 and 5, respectively. In some implementations, the wireless communication device 800 can be an example implementation of the wireless communication device 700 described above with reference to FIG. 7. For example, the wireless communication device 800 can be a chip, SoC, chipset, package or device that includes at least one processor and at least one modem (for example, a Wi-Fi (IEEE 802.11) modem or a cellular modem).

The wireless communication device 800 includes a reception component 808, a communicating component 198, and a transmission component 810. The communicating component 198 may further optionally include one or more of a time period determining component 812, a reference band determining component 814, and/or a beam switching component 816. Portions of one or more of the components 812, 814, and 816, may be implemented at least in part in hardware or firmware. In some implementations, at least one of the components 812, 814, and 816, is implemented at least in part as software stored in a memory (such as the memory 708). For example, portions of one or more of the components 812, 814, and 816, can be implemented as non-transitory instructions or code executable by a processor (such as the processor 706) to perform the functions or operations of the respective component.

The reception component 808 is configured to receive RX signals from another wireless communication device. In some implementations, the RX signals may include a configuration or parameters for switching a common beam. The communicating component 198 is configured to switch a beam used for receiving RX signals or transmitting TX signals via transmission component 810, as described herein. Moreover, as described, time period determining component 812 can determine a time period for switching the common beam, reference band determining component 814 can determine a reference band for switching the common beam, or beam switching component 816 can switch the common beam.

Figure 9:
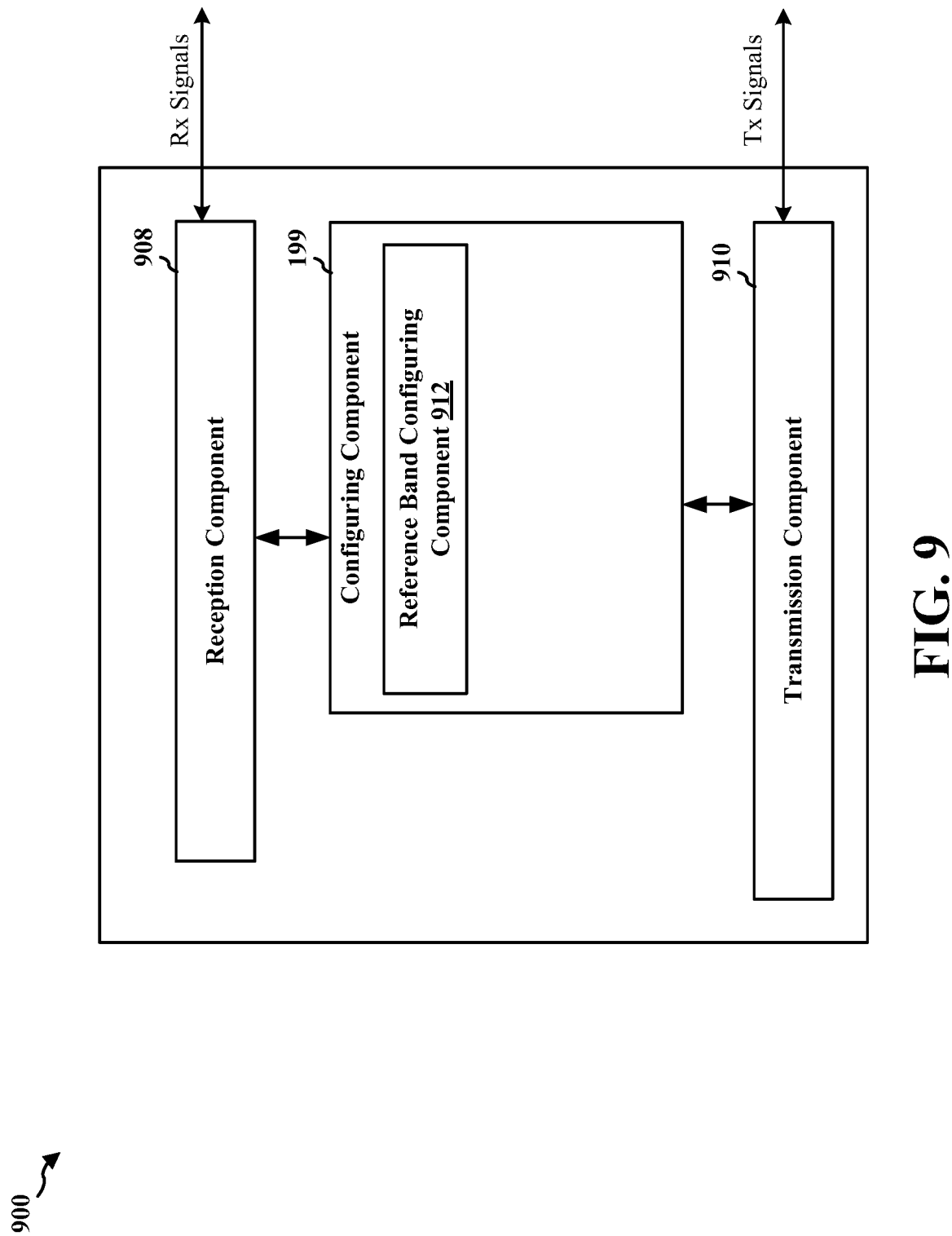
FIG. 9 shows a block diagram of an example wireless communication device according to some implementations.

FIG. 9 shows a block diagram of an example wireless communication device 900 according to some implementations. In some implementations, the wireless communication device 900 is configured to perform process 600 described above with reference to FIG. 6. In some implementations, the wireless communication device 900 can be an example implementation of the wireless communication device 700 described above with reference to FIG. 7. For example, the wireless communication device 900 can be a chip, SoC, chipset, package or device that includes at least one processor and at least one modem (for example, a Wi-Fi (IEEE 802.11) modem or a cellular modem).

The wireless communication device 900 includes a reception component 908, a configuring component 199, and a transmission component 910. The configuring component 199 may further include a reference band configuring component 912. Portions of one or more of the components 912 may be implemented at least in part in hardware or firmware. In some implementations, at least one of the components 912 is implemented at least in part as software stored in a memory (such as the memory 708). For example, portions of one or more of the components 912 can be implemented as non-transitory instructions or code executable by a processor (such as the processor 706) to perform the functions or operations of the respective component.

The reception component 808 is configured to receive RX signals from another wireless communication device. In some implementations, the RX signals may include uplink signals received from a UE 104, where the UE can switch a common beam used to transmit the uplink signals. The configuring component 199 is configured to configure, via reference band configuring component 912, a reference band for the UE to use in switching the common beam.

The following aspects are illustrative only and aspects thereof may be combined with aspects of other embodiments or teaching described herein, without limitation.

Aspect 1 is a method for wireless communication by a UE including communicating with a base station over multiple frequency bands using a first beam, determining to switch the first beam to a second beam, determining a time period during which to switch the first beam to the second beam, where the time period is one of a limited number of time periods within a specified duration during which the UE is allowed to switch the first beam to the second beam, and switching from the first beam to the second beam during the time period.

In Aspect 2, the method of Aspect 1 includes where determining the time period includes determining the time period as one or more symbols of a limited number of symbols within the specified duration.

In Aspect 3, the method of Aspect 2 includes where determining the time period includes determining the time period within a transmission gap between uplink and downlink communications.

In Aspect 4, the method of Aspect 3 includes reporting, to the base station, a receive time difference, where the transmission gap is set based on the receive transmit difference.

In Aspect 5, the method of any of Aspects 2 to 4 includes where determining the time period as the one or more symbols includes determining the time period as the one or more symbols in a slot based on a function of a slot index of the slot.

In Aspect 6, the method of any of Aspects 1 to 5 includes where determining the time period includes determining the time period as one or more symbols for communications other than symbols for at least one of a synchronization signal block, a physical downlink control channel search space, or a reference signal.

In Aspect 7, the method of any of Aspects 1 to 6 includes where determining the time period is based at least in part on receiving, from the base station, an indication of the time period.

In Aspect 8, the method of Aspect 7 includes where receiving the indication includes receiving, from the base station, the indication over one or more of a control channel, system information, a MIB, a MAC-CE, or RRC signaling.

In Aspect 9, the method of any of Aspects 1 to 8 includes where determining the time period is based at least in part on receiving, from the base station, one or more parameters for determining the time period.

In Aspect 10, the method of any of Aspects 1 to 9 includes reporting, to the base station, a difference between a first time at which a signal is received in a first band and a second time at which the signal is received in a second band.

Aspect 11 is a method for wireless communications including communicating with a base station over multiple frequency bands using a first beam, determining to switch the first beam to a second beam, determining a reference band from the multiple frequency bands to use as a timing reference for switching the first beam to the second beam, determining timing associated with communications over the reference band, determining a time period during which to switch the first beam to the second beam based on the timing, and switching, during the time period, from the first beam to the second beam.

In Aspect 12, the method of Aspect 11 includes where determining the reference band includes receiving, from the base station, an indication of the reference band to use as the timing reference for switching beams.

In Aspect 13, the method of any of Aspects 11 or 12 includes where determining the reference band is based on receiving, from the base station, an indication of one or more non-reference bands of the multiple frequency bands.

In Aspect 14, the method of any of Aspects 11 to 13 includes where switching from the first beam to the second beam includes dropping communications over symbols on one or more of the multiple frequency bands other than the reference band.

In Aspect 15, the method of any of Aspects 11 to 14 includes where determining the reference band includes determining one of the multiple frequency bands over which the UE most recently reports a signal metric to the base station as the reference band.

In Aspect 16, the method of Aspect 15 includes where the signal metric includes one or more of a RSRP, a RSRQ, a SNR, a SINR, or a RSSI.

In Aspect 17, the method of any of Aspects 11 to 16 includes where determining the reference band includes determining one of the multiple frequency bands having a highest reported signal metric as the reference band.

In Aspect 18, the method of Aspect 17 includes where the signal metric includes one or more of a RSRP, a RSRQ, a SNR, a SINR, or a RSSI.

In Aspect 19, the method of any of Aspects 11 to 18 includes where determining the reference band includes determining one of the multiple frequency bands that has at least one of a lowest index, a center frequency, or a most frequent PDCCH search space.

In Aspect 20, the method of any of Aspects 11 to 19 includes where determining the reference band includes determining one of the multiple frequency bands that has one or more channels of a highest priority as the reference band.

In Aspect 21, the method of Aspect 20 includes determining a priority of channels, to determine the one of the multiple frequency bands that has channels of a highest priority, based on at least one of a channel type of each of the channels, a SCS of each of the channels, a number of symbols in each of the channels, whether each of the channels is a beam reference, feedback in consideration of SCS for each of the channels, a number of instances of feedback received for a PDCCH or a PDSCH for each of the channels, a channel quality indicator, or whether each of the channels is scheduled or autonomous.

Aspect 22 is a method for wireless communications including communicating with a UE over multiple frequency bands using a first beam, and transmitting, to the UE, an indication of one or more parameters for determining a reference band of the multiple frequency bands to use as a timing reference for switching beams for communicating over the multiple frequency bands.

In Aspect 23, the method of Aspect 22 includes where the one or more parameters include an indication of the reference band.

In Aspect 24, the method of any of Aspects 22 or 23 includes where the one or more parameters include an indication of one or more non-reference bands of the multiple frequency bands.

In Aspect 25, the method of any of Aspects 22 to 24 includes determining the reference band as one of the multiple frequency bands over which the UE has most recently reported a signal metric.

In Aspect 26, the method of any of Aspects 22 to 25 includes determining the reference band as one of the multiple frequency bands having a highest reported signal metric.

Aspect 27 is a method for wireless communication by a UE including concurrently communicating with a base station over multiple frequency bands using a same first beam, and switching, according to beam switching criteria, from the first beam to a second beam during a time period, where the time period is one of a limited number of time periods during which the UE is allowed to switch the first beam to the second beam within a specified duration, or based on a timing reference associated with a reference band of the multiple frequency bands.

In Aspect 28, the method of Aspect 27 includes where the time period includes one or more symbols of a limited number of symbols within the specified duration, and dropping the one or more symbols within at least one of the multiple frequency bands within the specified duration.

In Aspect 29, the method of Aspect 28 includes where the time period is within a transmission gap between uplink and downlink communications, and reporting, to the base station, a receive time difference between a time a first signal is received by the UE in a first frequency band of the multiple frequency bands and a time a second signal is received by the UE in a second frequency band of the multiple frequency bands, where the transmission gap is set based on the receive time difference.

In Aspect 30, the method of any of Aspects 27 to 29 includes where the time period consists of one or more symbols for communications other than symbols for at least one of a SSB, a PDCCH search space, or a reference signal.

In Aspect 31, the method of any of Aspects 27 to 30 includes receiving, from the base station, an indication of the time period or one or more parameters for determining the time period.

In Aspect 32, the method of any of Aspects 27 to 31 includes receiving, from the base station, at least one of an indication of the reference band to use as the timing reference for switching beams or an indication of one or more non-reference bands of the multiple frequency bands.

In Aspect 33, the method of any of Aspects 27 to 31 includes dropping communications over symbols on one or more of the multiple frequency bands other than the reference band during at least the switch from the first beam to the second beam.

In Aspect 34, the method of any of Aspects 27 to 33 includes where the reference band is associated with a highest signal metric of the multiple frequency bands in a most recent report, where the signal metric includes one or more of a RSRP, a RSRQ, a SNR, a SINR, or a RSSI.

In Aspect 35, the method of any of Aspects 27 to 34 includes where the reference band is associated with one of the multiple frequency bands having a lowest index, a center frequency, or a most frequent PDCCH search space.

In Aspect 36, the method of any of Aspects 27 to 35 includes where the reference band is associated with one of the multiple frequency bands that has one or more channels of a highest priority, where the priority of channels is based on at least one of respective channel types of the channels, respective SCSs of the channels, respective numbers of symbols in the channels, whether each of the channels is a beam reference, feedback for each of the channels, respective numbers of instances of feedback received for a PDCCH or a PDSCH for the channels, a channel quality indicator, or whether each of the channels is scheduled or autonomous.

Aspect 37 is an apparatus for wireless communication including a transceiver, a memory configured to store instructions, and one or more processors communicatively coupled with the transceiver and the memory, where the one or more processors are configured to execute the instructions to perform the operations of one or more methods in any of Aspects 1 to 36.

Aspect 38 is an apparatus for wireless communication including means for performing the operations of one or more methods in any of Aspects 1 to 36.

Aspect 39 is a computer-readable medium including code executable by one or more processors to perform the operations of one or more methods in any of Aspects 1 to 36.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may include A only, B only, C only, A and B only, A and C only, B and C only, or A and B and C, where any such combinations may contain one or more members of any of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
concurrently communicate with a base station over multiple frequency bands using a same first beam; and
switch, according to beam switching criteria, from the first beam to a second beam during a time period, wherein the time period is based on a timing reference associated with a reference band.

2. The apparatus of claim 1, wherein the one or more processors are configured to execute the instructions to cause the apparatus to receive, from the base station, at least one of an indication of the reference band or an indication of one or more non-reference bands of the multiple frequency bands based on which the reference band is determined.

3. The apparatus of claim 1, wherein the one or more processors are configured to execute the instructions to cause the apparatus to drop communications over symbols on one or more of the multiple frequency bands other than the reference band during at least the switch from the first beam to the second beam.

4. The apparatus of claim 1, wherein the reference band is associated with a highest signal metric of the multiple frequency bands in a most recent report, wherein the signal metric includes one or more of a reference signal received power (RSRP), a reference signal received quality (RSRQ), a signal-to-noise ratio (SNR), a signal-to-interference-and-noise ratio (SINR), or a received signal strength indicator (RSSI).

5. The apparatus of claim 1, wherein the reference band is associated with one of the multiple frequency bands having a lowest index, a center frequency, or a most frequent physical downlink control channel (PDCCH) search space.

6. The apparatus of claim 1, wherein the reference band is associated with a frequency band of the multiple frequency bands that has a first priority for one or more channels associated with the frequency band that is higher than a second priority for one or more other channels associated with one or more other frequency bands of the multiple frequency bands.

7. The apparatus of claim 6, wherein the first priority and the second priority are associated with respective channel types of the one or more channels and the one or more other channels.

8. The apparatus of claim 6, wherein the first priority and the second priority are associated with respective subcarrier spacings (SCSs) of the one or more channels and the one or more other channels.

9. The apparatus of claim 6, wherein the first priority and the second priority are associated with respective numbers of symbols in the one or more channels and the one or more other channels.

10. The apparatus of claim 6, wherein the first priority and the second priority are associated with whether the one or more channels and the one or more other channels are a beam reference.

11. The apparatus of claim 6, wherein the first priority and the second priority are associated with respective feedback for the one or more channels and the one or more other channels.

12. The apparatus of claim 6, wherein the first priority and the second priority are associated with whether each of the one or more channels and the one or more other channels are scheduled or autonomous.

13. A method for wireless communication, comprising:
concurrently communicating with a base station over multiple frequency bands using a same first beam; and
switching, according to beam switching criteria, from the first beam to a second beam during a time period, wherein the time period is based on a timing reference associated with a reference band.

14. The method of claim 13, further comprising receiving, from the base station, at least one of an indication of the reference band or an indication of one or more non-reference bands of the multiple frequency bands based on which the reference band is determined.

15. The method of claim 13, further comprising dropping communications over symbols on one or more of the multiple frequency bands other than the reference band during at least the switch from the first beam to the second beam.

16. The method of claim 13, wherein the reference band is associated with a highest signal metric of the multiple frequency bands in a most recent report, wherein the signal metric includes one or more of a reference signal received power (RSRP), a reference signal received quality (RSRQ), a signal-to-noise ratio (SNR), a signal-to-interference-and-noise ratio (SINR), or a received signal strength indicator (RSSI).

17. The method of claim 13, wherein the reference band is associated with one of the multiple frequency bands having a lowest index, a center frequency, or a most frequent physical downlink control channel (PDCCH) search space.

18. The method of claim 13, wherein the reference band is associated with a frequency band of the multiple frequency bands that has a first priority for one or more channels associated with the frequency band that is higher than a second priority for one or more other channels associated with one or more other frequency bands of the multiple frequency bands.

19. A non-transitory computer-readable medium including code executable by one or more processors for wireless communication, the code comprising code for:
concurrently communicating with a base station over multiple frequency bands using a same first beam; and
switching, according to beam switching criteria, from the first beam to a second beam during a time period, wherein the time period is based on a timing reference associated with a reference band.

20. The non-transitory computer-readable medium of claim 19, the code further comprising code for receiving, from the base station, at least one of an indication of the reference band or an indication of one or more non-reference bands of the multiple frequency bands based on which the reference band is determined.

* * * * *